US012177618B2

(12) United States Patent
Xie et al.

(10) Patent No.: US 12,177,618 B2
(45) Date of Patent: Dec. 24, 2024

(54) ADJUSTABLE HEADPHONE

(71) Applicant: HARMAN INTERNATIONAL INDUSTRIES, INCORPORATED, Stamford, CT (US)

(72) Inventors: Xianghong Xie, Guangdong (CN); Jieyu Chen, Guangdong (CN); Pingdong Yang, Guangdong (CN)

(73) Assignee: Harman International Industries, Incorporated, Stamford, CT (US)

( * ) Notice: Subject to any disclaimer, the term of this patent is extended or adjusted under 35 U.S.C. 154(b) by 34 days.

(21) Appl. No.: 17/792,207

(22) PCT Filed: Jan. 13, 2020

(86) PCT No.: PCT/CN2020/071780
§ 371 (c)(1),
(2) Date: Jul. 12, 2022

(87) PCT Pub. No.: WO2021/142575
PCT Pub. Date: Jul. 22, 2021

(65) Prior Publication Data

US 2023/0044893 A1 Feb. 9, 2023

(51) Int. Cl.
*H04R 1/10* (2006.01)
*H04R 5/033* (2006.01)

(52) U.S. Cl.
CPC .......... *H04R 1/1008* (2013.01); *H04R 1/105* (2013.01); *H04R 1/1058* (2013.01); *H04R 5/0335* (2013.01)

(58) Field of Classification Search
CPC .. H04R 1/1066; H04R 1/1058; H04R 5/0335; H04R 1/105; H04R 1/1008; H04R 5/033; H04R 2201/109; H04R 19/04; H04R 1/1033; H04R 1/1041; H04R 5/04; H04R 3/04; H04R 1/1091; H04R 31/00; H04M 1/05; A45D 8/002
(Continued)

(56) References Cited

U.S. PATENT DOCUMENTS 7,174,575 B1 2/2007 Scherer
2015/0272292 A1* 10/2015 Taylor .................. H04R 5/0335 132/275

FOREIGN PATENT DOCUMENTS

CN 103297890 A 9/2013
CN 104618830 A * 5/2015
(Continued)

OTHER PUBLICATIONS

Partial European Search Report dated Aug. 28, 2023 for European Patent Application No. 20914644.8, 14 pages.
(Continued)

*Primary Examiner* — Carolyn R Edwards
*Assistant Examiner* — Julie X Dang
(74) *Attorney, Agent, or Firm* — Brooks Kushman P.C.

(57) ABSTRACT

The present disclosure provides an adjustable headphone including a head band assembly and two earpieces attached to two ends of the head band assembly, respectively. The head band assembly includes first and second elongate pieces each extending over a portion of the length of the head band assembly. At least one of the first and second elongate pieces is movable along the length of the head band assembly and including a first length portion and a second length portion having a larger bending strength than the first length portion.

19 Claims, 7 Drawing Sheets

(58) Field of Classification Search
USPC ................ 381/383, 378, 370, 379, 374, 377
See application file for complete search history.

(56) References Cited

FOREIGN PATENT DOCUMENTS

| | | | |
|---|---|---|---|
| CN | 106454586 | A | 2/2017 |
| CN | 209608831 | U | 11/2019 |
| EP | 2433433 | B1 | 6/2017 |
| JP | H1023586 | A | 1/1998 |
| WO | 2013028127 | A1 | 2/2013 |

OTHER PUBLICATIONS

International Search Report and Written Opinion dated Sep. 28, 2020 for PCT Appn. No. PCT/CN2020/071780 filed Jan. 13, 2020, 9 pgs.
Extended European Search Report dated Dec. 7, 2023 for European Patent Application No. 20914644.8, 15 pages.
First Chinese Office Action dated Oct. 22, 2024 for Chinese Patent Application No. 202080093103.0, 17 pages.

* cited by examiner

1

2

3

6

7

ADJUSTABLE HEADPHONE

CROSS-REFERENCE TO RELATED APPLICATION

This application is the U.S. national phase of PCT Application No. PCT/CN2020/071780 filed on Jan. 13, 2020, the disclosure of which is hereby incorporated in its entirety by reference herein.

TECHNICAL FIELD

This disclosure relates in general to an adjustable headphone, and particularly to a headphone capable of applying an adjustable clamping force for the wearer.

BACKGROUND ART

Headphones, especially cordless headphones, are becoming more and more popular in recent years, and people are more willing to wear them while doing various activities, such as while exercising in the gym or during lifestyle activities or while riding the metro. Normally, the headphone needs to provide a strong clamping to prevent it from slipping off while the wearer is doing exercises in the gym. On the other hand, a loose clamping of the headphone may be preferred for a long and comfortable wearing while the wearer is in a lifestyle activity. Moreover, sometimes the wearer wants the headphone to provide a moderate clamping so as to provide a sealing function when he or she is in a noisy environment, such as when riding the metro. There already exist headphones that have adjustable headbands to suit the size of the wearer's head. However, such headphones can neither provide a relatively large range of adjustable clamping force nor provide a precise adjustment of the clamping force.

SUMMARY OF THE INVENTION

According to one aspect of the disclosure, an adjustable headphone is provided, comprising: a head band assembly; and two earpieces attached to two ends of the head band assembly, respectively; wherein the head band assembly comprises: a first and second elongate pieces each extending over a portion of the length of the head band assembly, at least one of the elongate pieces is movable along the length of the head band assembly and comprises a first length portion and a second length portion having a larger bending strength than the first length portion.

Optionally, each of the elongate pieces is movable along the length of the head band assembly and comprises a first length portion and a second length portion having a larger bending strength than the first length portion.

Optionally, the first elongate piece and the second elongate piece are movable between a first position and a second position, wherein in the first position, a majority of the first length portion of each of the first and second elongate pieces overlaps the second length portion of the other of the first and second elongate pieces, and in the second position, the first length portion of each of the first and second elongate pieces does not overlap the second length portion of the other of the first and second elongate pieces.

Optionally, in the second position, only a portion of the first length portions of the first and second elongate pieces overlap each other.

Optionally, the first length portion of each of the elongate pieces extends from its corresponding second length portion and toward the second length portion of the other elongate piece.

Optionally, the first length portion of each of the elongate pieces extends from its corresponding second length portion and toward the second length portion of the other elongate piece, and wherein the second length portions of the elongate pieces are closer to each other in the first position than in the second position.

Optionally, the head band assembly has a largest bending strength in the first position and a smallest bending strength in the second position.

Optionally, the first length portion has a smaller width than the second length portion.

Optionally, the first length portion has a smaller thickness than the second length portion.

Optionally, the first length portion is formed of a material having a smaller bending modulus than the second length portion.

Optionally, the head band assembly further comprises an actuator for moving the first and second elongate pieces.

Optionally, the rotation of the actuator causes the first and second elongate pieces to move in opposite directions along the length of the head band assembly.

Optionally, the actuator comprises a gear and each of the first length portions of the first and second elongate pieces comprises a gear rack meshed with the gear of the actuator, and the rotation of the actuator moves the first and second elongate pieces in opposite directions along the length of the head band assembly.

Optionally, the actuator comprises a ratchet wheel and each of the first length portions of the first and second elongate pieces comprises a ratchet portion engaged with the ratchet wheel of the actuator, and the rotation of the actuator moves the first and second elongate pieces in opposite directions along the length of the head band assembly.

Optionally, the actuator is in a friction engagement with each of the first length portions of the first and second elongate pieces, and the rotation of the actuator moves the first and second elongate pieces in opposite directions along the length of the head band assembly.

Optionally, the head band assembly further comprises a housing and the first and second elongate pieces are mounted and movable within the housing.

Optionally, the housing comprises an upper housing part, the upper housing part comprising an elongate base portion and a plurality of sidewall portion pairs, each pair of the sidewall portion pairs has two opposing sidewall portions, with one sidewall portion extending downwardly from one side of the base portion, and the other sidewall portion extending downwardly from the other side of the base portion, wherein at least some of the sidewall portions are formed with an inwardly extending ledge, and the lower surface of the base portion, the sidewall portions and the ledge define a channel for receiving the elongate pieces and cooperate to facilitate the movement of the elongate pieces.

Optionally, at least some of the sidewall portion pairs are formed with a hole in each of the opposing sidewall portions, and the holes in the opposing sidewall portions is configured to receive a roller, the rollers cooperates with the lower surface of the base portion, the sidewall portions and the ledges for facilitating the movement of the elongate pieces.

Optionally, the lower surface of the base portion is formed with a plurality of ribs for facilitating the movement of the elongate pieces.

Optionally, the actuator further comprises an actuator body connected to the gear and a folded ring pivotably connected to the actuator body for facilitating the rotation of the actuator.

Others systems, method, features and advantages of the disclosure will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

The disclosure can be better understood with reference to the flowing drawings and description. The components in the drawings are not necessarily to scale, emphasis instead being placed upon illustrating the principles of the disclosure. Moreover, in the figures, like reference numerals designate corresponding parts throughout the different views.

BRIEF DESCRIPTION OF THE PREFERRED EMBODIMENTS

Hereinafter, the preferred embodiment of the present disclosure will be described in more detail with reference to the accompanying drawings. In the following description of the present disclosure, a detailed description of known functions and configurations incorporated herein will be omitted when it may make the subject matter of the present disclosure rather unclear.

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various elements, components, steps or calculations, these elements, components, steps or calculations should not be limited by these terms, rather these terms are only used to distinguish one element, component, step or calculation from another. For example, a first component could be termed a second component, similarly a first calculation could be termed a second calculation; similarly a first step could be termed a second step; all without departing from the scope of this disclosure.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

As used herein, the term "overlap" used herein may entail that the overlapped components are in a same position along the length direction of the head band assembly. The term "length direction" or "longitudinal direction" may entail the direction along the arc or curve defined by the center line of the head band assembly.

The present disclosure provides a headphone that can provide a relatively large range of adjustable clamping force as well as a precise adjustment of the clamping force.

Figure 1:
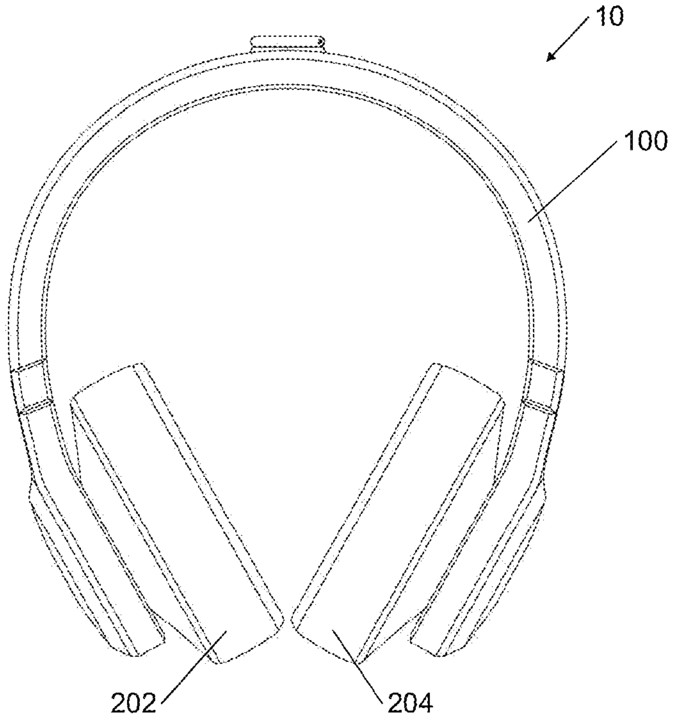
FIG. 1 shows a front view of a headphone according to an embodiment of the present disclosure.
Figure 2:
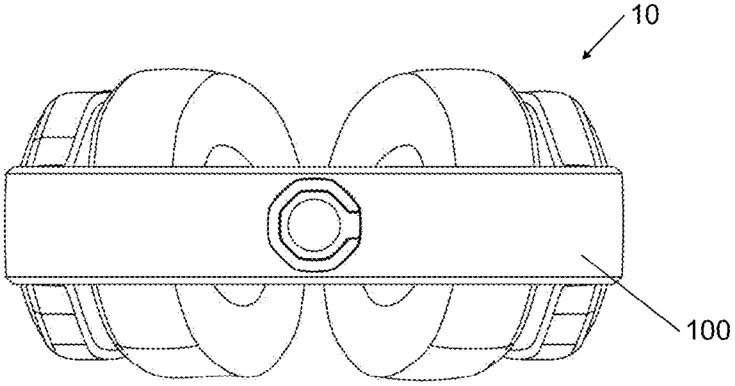
FIG. 2 shows a top view of the headphone of FIG. 1.

FIGS. 1 and 2 show a headphone 10 according to an embodiment of the present disclosure, wherein FIG. 1 shows a front view of the headphone and FIG. 2 shows a top view of the headphone. As shown in FIGS. 1 and 2, the headphone 10 comprises a head band assembly 100 and two ear pieces 202, 204 attached, respectively, to the ends 102, 104 of the head band assembly 100.

Figure 3:
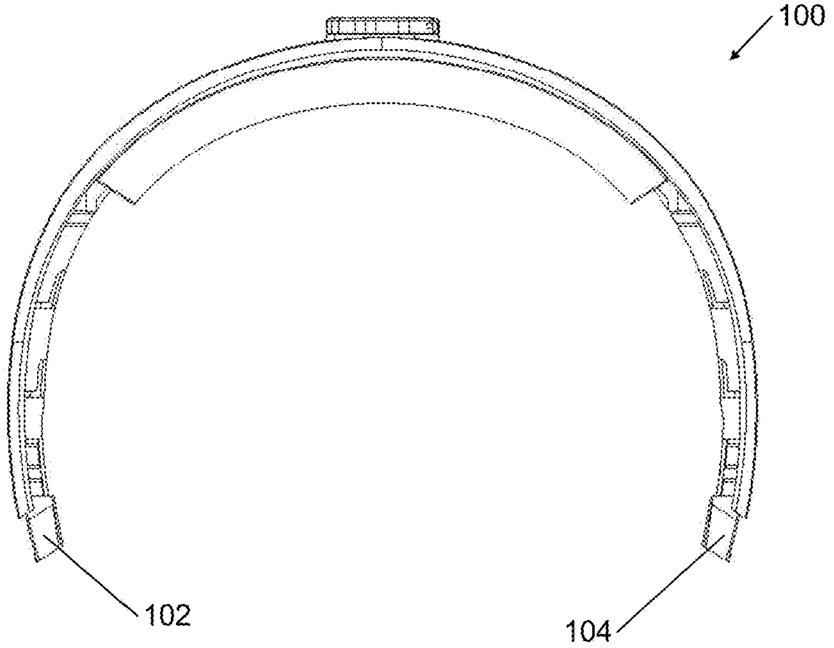
FIG. 3 show a front view of the head band assembly of the headphone of FIG. 1.
Figure 4A:
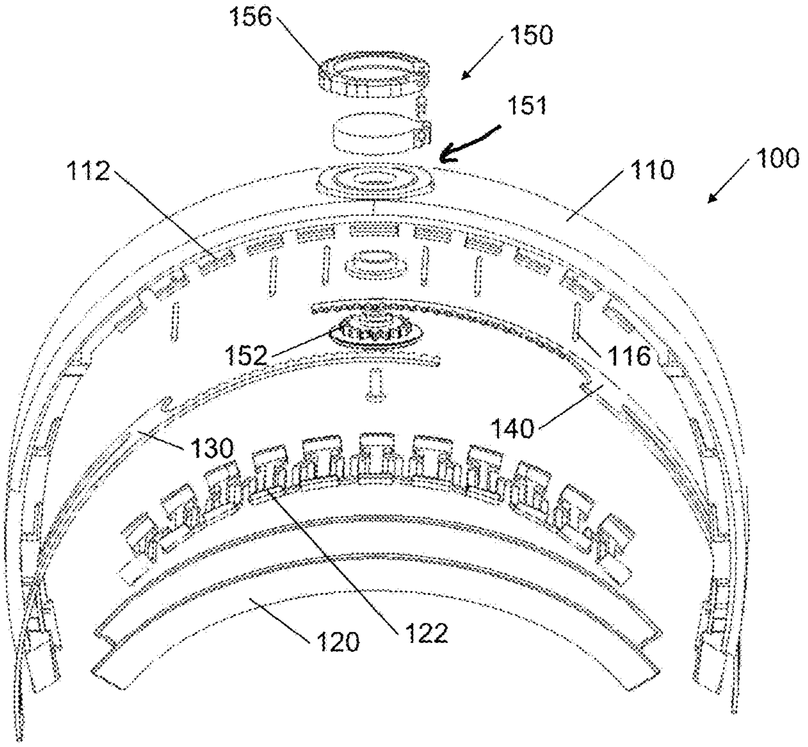
FIG. 4A shows an exploded view of the head band assembly of FIG. 3 in the smallest clamping force position.
Figure 4B:
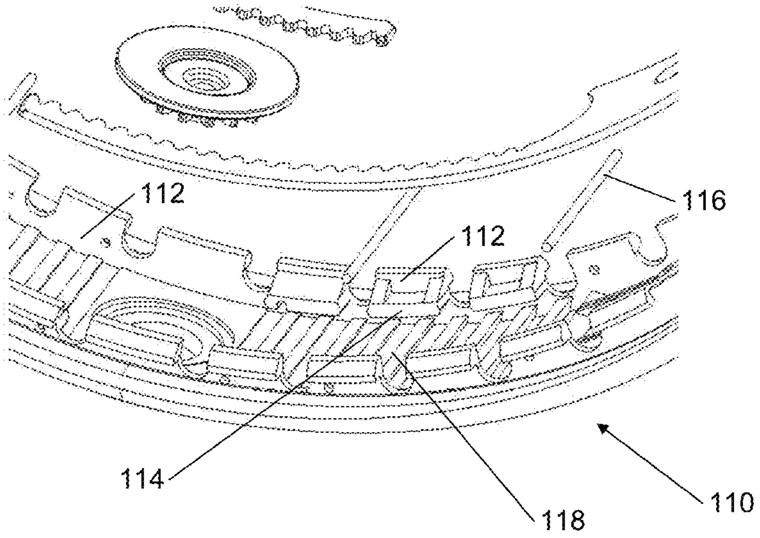
FIG. 4B is another exploded view, showing a portion of the head band assembly from a bottom view.
Figure 5:
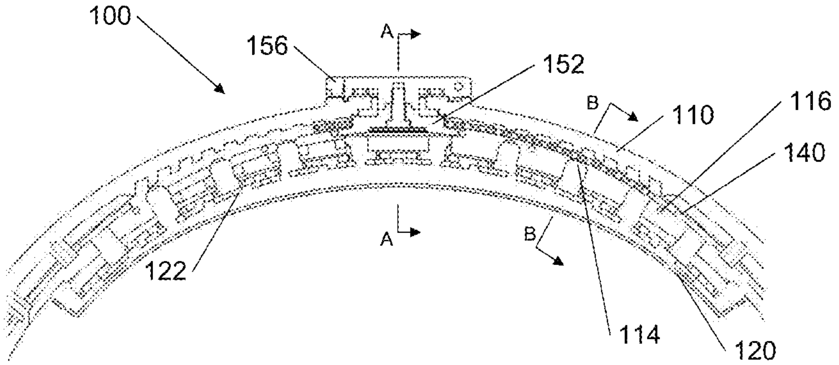
FIG. 5 is a sectional view of the head band assembly of FIG. 3 in the smallest clamping force position.
Figure 6A:
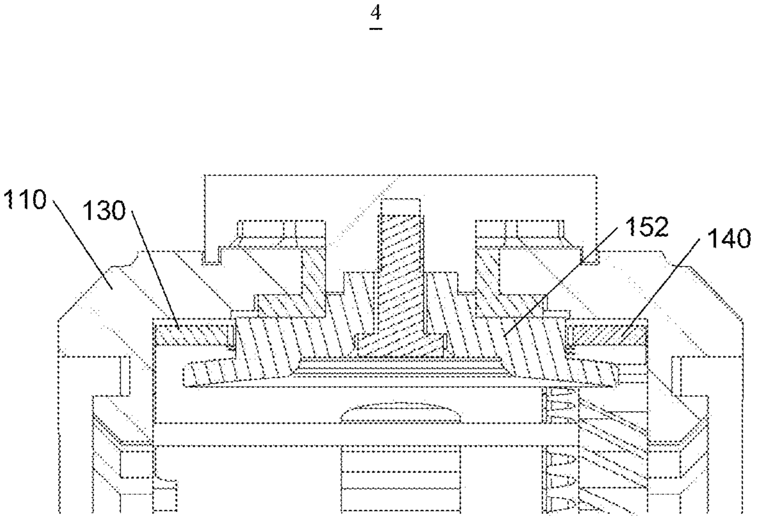
FIG. 6A is a sectional view taken along line A-A of FIG. 5.
Figure 6B:
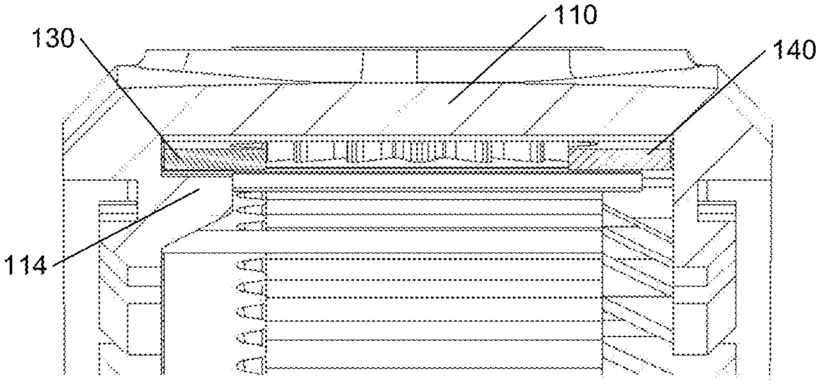
FIG. 6B is a sectional view taken along line B-B of FIG. 5.
Figure 7A:
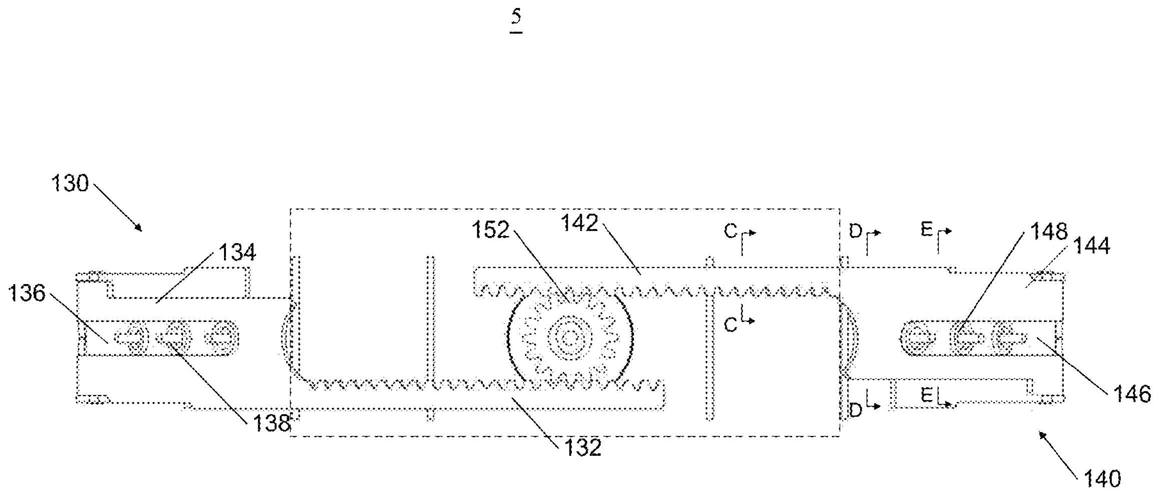
FIGS. 7A and 7B are top views showing the head band assembly of FIG. 3 in the smallest clamping force position, with certain components of the head band assembly removed for clarification.
Figure 7B:
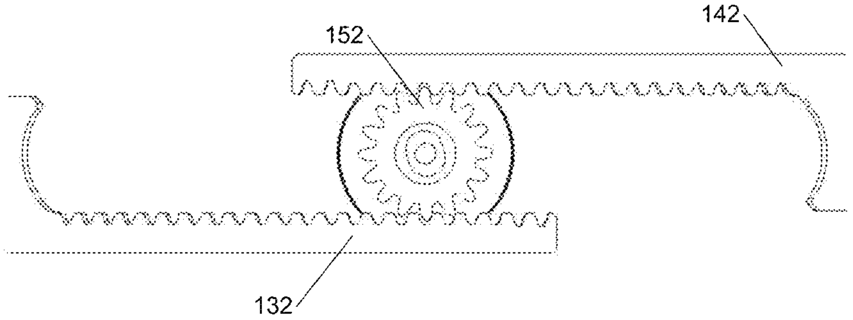

FIG. 3 show a front view of the head band assembly 100. FIGS. 4A-4B, 5, 6A-6B, 7A-7B show the smallest clamping force position of the head band assembly 100, wherein FIG. 4A-4B show exploded views of the head band assembly 100, FIG. 5, FIGS. 6A-6B are a sectional view of the head band assembly 100, and FIGS. 7A and 7B are top views of the head band assembly 100.

As shown, the head band assembly 100 comprises an upper housing 110, a lower housing 120, an intermediate bracket 122, a first movable elongate piece 130, a second movable elongate piece 140 and a rotary knob 150. As clearly shown in FIGS. 4A-4B and 5, the upper housing 110 comprises an elongate base portion 118 and a plurality of sidewall portion pairs 112. Each of the sidewall portion pair 112 has two opposing sidewall portions 112, with one sidewall portion 112 extending downwardly from one side of the base portion, and the other sidewall portion extending downwardly from the other side of the base portion. As clearly shown in FIG. 4B, some of the sidewall portions 112 are formed with a ledge extending inwardly from the lower end of the sidewall portion. Some of the sidewall portion pairs are formed with a hole in each of the opposing sidewall portions, with the holes in the opposing sidewall portions being aligned with each other so that a roller can be received in the holes in the opposing sidewall portions. As shown, the lower surface of the base portion 118, the sidewall portions 112 and the ledges 114 define a channel for receiving the elongate pieces 130, 140. The rollers 116 cooperate with the lower surface of the base portion 118, the sidewall portions 112 and the ledges 114 to guide and facilitate the movement of the elongate pieces 130, 140. As shown in FIG. 4B, the lower surface of the base portion 118 is formed with a plurality of ribs for facilitating the movement of the elongate pieces 130, 140.

As clearly shown in FIGS. 7A and 7B, the movable elongate piece 130 comprises a wide strip portion 134 and a narrow strip portion 132. The narrow strip portion 132 extends from an end of the wide strip portion 134 and toward the movable elongate piece 140. The narrow strip portion 132 is formed with a row of teeth for engaging with the gear 152 of the rotary knob 150. The wide strip portion 134 is formed with a groove 136 extending in the longitudinal direction of the elongate piece. Guiding assemblies (rod and wheel) 138 are positioned in the groove 136 for guiding the movement of the movable elongate piece 130. Similarly, the movable elongate piece 140 comprises a wide strip portion 144 and a narrow strip portion 142. The narrow strip portion 142 extends from an end of the wide strip portion 144 and toward the movable elongate piece 130. The narrow strip portion 142 is formed with a row of teeth for engaging with the gear 152 of the rotary knob 150. The wide strip portion 144 is formed with a groove 146 extending in the longitudinal direction of the elongate piece. Guiding assemblies 148 are positioned in the groove 146 for guiding the movement of the movable elongate piece 140.

As shown in FIGS. 7A and 7B, the teeth of narrow strip portion 142 of the movable elongate piece 140 engage the gear 152 from the upper side while the teeth of the narrow strip portion 132 of the movable elongate piece 130 engage the gear 152 from the lower side. In this configuration, the anticlockwise rotation of the gear 152 will move the movable elongate piece 140 toward the movable elongate piece 130 and move the movable elongate piece 130 toward the movable elongate piece 140, and thus will cause the movable elongate pieces 130, 140 to move closer to each other. On the other hand, the clockwise rotation of the gear 152 will move the movable elongate piece 140 away from the movable elongate piece 130 and move the movable elongate piece 130 away from the movable elongate piece 140, and thus cause the movable elongate pieces 130, 140 to move further apart from each other.

Figure 10:
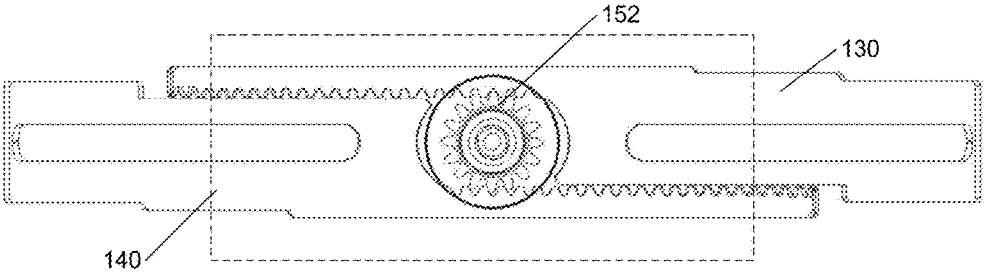
FIG. 10 is a top view showing the head band assembly of FIG. 3 in the largest clamping force position, with certain components of the head band assembly removed for clarification.

As can see from FIG. 7A, the guiding assemblies 138, 148 are, respectively, in contact with ends of the grooves 136, 146, and thus will stop the movable elongate pieces 130, 140 from moving further apart from each other, and thus the position shown in FIG. 7A is the furthest apart position of the movable elongate pieces 130, 140. On the other hand, FIG. 10 shows the nearest position of the movable elongate pieces 130, 140. Thus, the rotation of the knob 150 can move the movable elongate pieces 130, 140 to the position shown in FIG. 7A and the position shown in FIG. 10, as well as any intermediate position therebetween.

As shown in FIGS. 1 and 2, the earpieces 202, 204 are close to each other when the headphone 10 is in its rest position. When the headphone 10 is worn by a wearer, the head band assembly 100 need to be expanded so that the headphone 10 can accommodate the head of the wearer, and such an expansion of the head band assembly 100 will produce a clamping force upon the head of the wearer. The clamping force applied by the movable elongate pieces 130, 140 of the head band assembly 100 can be calculated by the following equations:

$$\delta = M^*\varepsilon,$$

$$M = W^*T^3/12,$$

wherein T: thickness; W: width; M: bending moment; δ: stress; ε: strain.

Figure 7C:
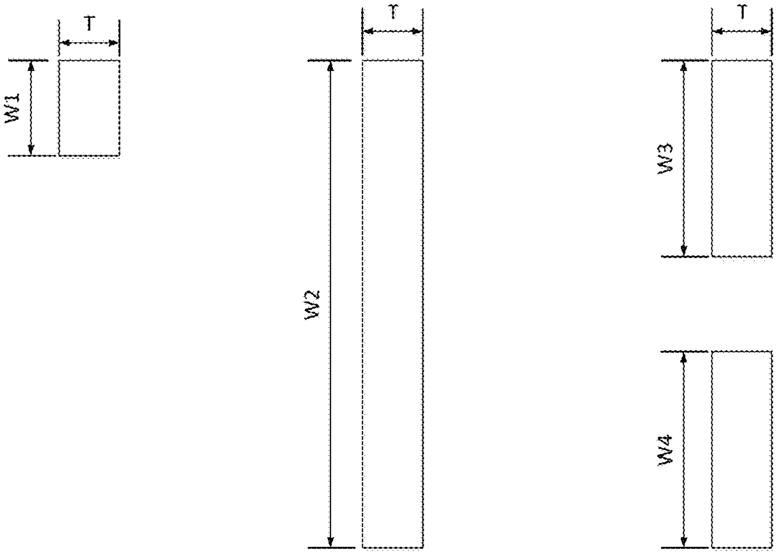
FIG. 7C are sectional views taken along line C-C, line D-D, and line E-E of FIG. 7A.
Figure 8:
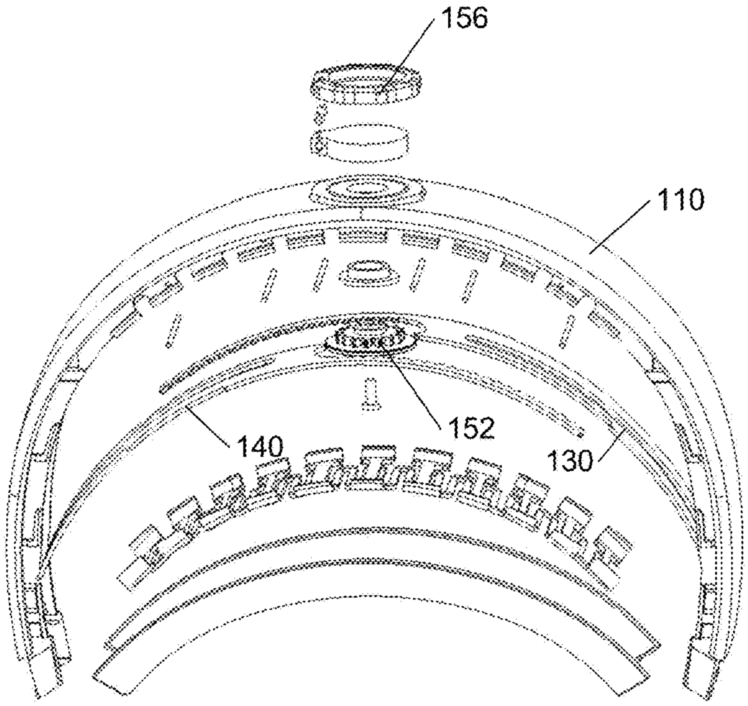
FIG. 8 shows an exploded view of the head band assembly of FIG. 3 in the largest clamping force position.
Figure 9:
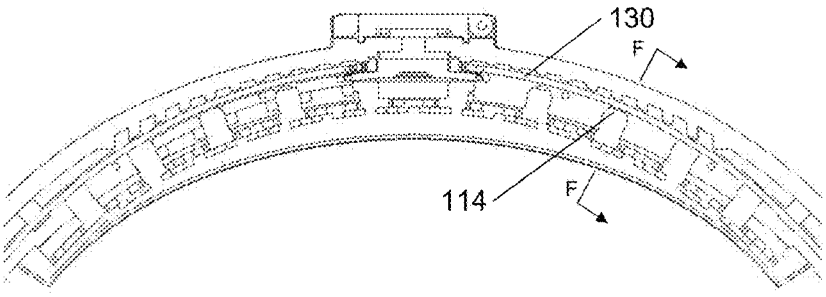
FIG. 9 is a sectional view showing the head band assembly of FIG. 3 in the largest clamping force position.
Figure 11:
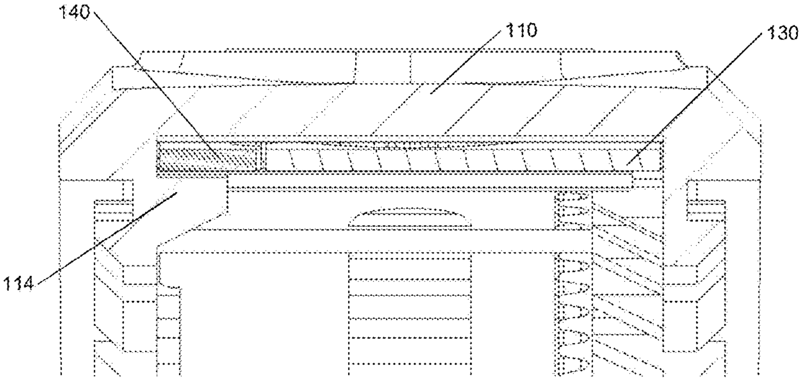
FIG. 11 is a sectional view taken along line F-F of FIG. 9.

FIG. 7C are sectional views taken along line C-C, line D-D, and line E-E of FIG. 7A. As shown in FIG. 7C, the movable elongate pieces 130, 140 have a constant thickness T, and thus the M value of the movable elongate pieces is primarily dependent upon the W value. The narrow strip portion 132, 142 has a width W that is much less than that of the wide strip portion 134, 144, and thus the narrow strip portions 132, 142 has a M value that is much less than that of the wide strip portion 134, 144. As shown in FIGS. 7A, 7B, 6B, the narrow strip portion 132 of the elongate piece 130 does not overlap the wide strip portion 144 of the elongate piece 140, and the narrow strip portion 142 of the elongate piece 140 does not overlap the wide strip portion 134 of the elongate piece 130 in the position shown in FIG. 7A. As shown in FIGS. 10 and 11, a majority of the narrow strip portion 132 of the elongate piece 130 overlaps the wide strip portion 144 of the elongate piece 140, and a majority of the narrow strip portion 142 of the elongate piece 140 overlaps the wide strip portion 134 of the elongate piece 130 in the position shown in FIG. 10. Therefore, the combine M value of the movable elongate pieces 130, 140 in the dashed line area of FIG. 7A is much less than that in the dashed line area of FIG. 10. In the preferred embodiment of the present disclosure, the movable elongate pieces 130, 140 are made from stainless steel while the upper housing is made of plastic that has a much less modulus than the stainless steel, and thus the total M value of the corresponding part of the head band assembly 100 is dominantly dependent upon the combine M value of the movable elongate pieces 130, 140. Therefore, the headphone 10 in the position shown in FIG. 7A applies a much less clamping force upon the wearer than the headphone 10 in the position shown in FIG. 10.

As mentioned above, the rotation of the knob 150 can move the movable elongate pieces 130, 140 to the position shown in FIG. 7A and the position shown in FIG. 10, as well as any intermediate position between the two positions. Thus, in addition to the position shown in FIG. 7A and position shown in FIG. 10, the headphone 10 can apply upon the wearer any intermediate clamping force between the clamping forces applied in the two positions. In addition, the gear-gear rack configuration of the present disclosure can precisely control the position of the movable elongate pieces 130, 140, and thus can precisely control the clamping force applied by the headphone 10. Therefore, the headphone 10 has the technical advantage of capable of providing a relatively large range of adjustable clamping force as well as a precise adjustment of the clamping force.

As shown, the rotary knob 150 comprises a gear 152, a knob body 151 (or actuator body) connected to the gear, and a pivotable ring 156 (also referred to as a folded ring) that is pivotably connected to the knob body 151. The pivotable ring 156 can be rotated away from the knob body 151 so as to facilitate the rotation of the knob 150, and can be rotated back into the storage position as shown in FIG. 4A and FIG. 5.

FIGS. 4A-4B, 5, 6A-6B, 8 and 9 show a specific housing structure for the present disclosure for guiding and facilitating the movement of the elongate pieces 130, 140. However, the present disclosure is not limited to this specific structure and any suitable structure capable of guiding and facilitating the movement of the elongate pieces 130, 140 therein is within the scope of the present disclosure. For example, the shown structure comprises ledge 114 and roller 116 for supporting the elongate pieces 130, 140. However, the present disclosure is not limited thereto, and the upper housing may include only the ledges or only the rollers.

The Figures shows a specific structure of the knob 150. However, the present disclosure is not limited to the specific structure of the knob, and any suitable structure that can rotate the gear is within the present disclosure. For example, any suitable actuator that can rotate the gear can be used in the present disclosure.

In the particular embodiment as shown in the drawings, a gear and gear rack arrangement is used to drive the movement of the movement of the elongate pieces 130, 140. However, the present disclosure is not limited to such arrangement, and any suitable mechanism that can drive the movement of the elongate pieces can be used in the present disclosure. For example, the actuator can comprise a threaded portion and the narrow strip portion 132, 142 each can comprise a gear rack meshed with the threaded portion of the actuator, and the rotation of the actuator moves the first and second elongate pieces in opposite directions along the length of the head band assembly. For example, the actuator can comprise a ratchet wheel and the narrow strip portion 132, 142 each can comprise a ratchet portion engaged with the ratchet wheel of the actuator, and the rotation of the actuator moves the first and second elongate pieces in opposite directions along the length of the head band assembly. For example, the actuator can is in a friction engagement with each of the first length portions of the narrow strip portion, and the rotation of the actuator moves the first and second elongate pieces in opposite directions along the length of the head band assembly.

In the particular embodiment as shown in the drawings, first and second elongate pieces each having a narrow strip portion and a wide strip portion are used to provide a first length portion having a smaller bending strength and a second length portion having a larger bending strength. However, the present disclosure is not limited thereto. Any elongate piece that can provide a first length portion having a smaller bending strength and a second length portion having a larger bending strength can be used in the present disclosure. For example, the first and second elongate pieces each may instead have a first length portion having a smaller thickness and a second length portion having a larger thickness to provide a first length portion having a smaller bending strength and a second length portion having a larger bending strength. For example, the first length portion may be formed of a material with a less bending modulus and the second length portion may be formed of a material with a larger bending modulus, so as to provide a first length portion having a smaller bending strength and a second length portion having a larger bending strength.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention. Accordingly, the disclosure is not to be restricted except in light of the attached claims and their equivalents.

The invention claimed is:

1. An adjustable headphone, comprising:

a head band assembly; and two earpieces attached to two ends of the head band assembly, respectively;

wherein the head band assembly comprises:

first and second elongate pieces each extending over a portion of a length of the head band assembly, at least one of the first and second elongate pieces being moveable along the length of the head band assembly and comprising a first length portion and a second length portion having a larger bending strength than the first length portion, wherein the head band assembly further comprises a housing and the first and second elongate pieces are mounted and movable within the housing, and wherein the housing comprises an upper housing part, the upper housing part comprising an elongate base portion and a plurality of sidewall portion pairs, each pair of the sidewall portion pairs has two opposing sidewall portions, with one sidewall portion extending downwardly from one side of the base portion, and the other sidewall portion extending downwardly from the other side of the base portion.

2. The adjustable headphone of claim 1, wherein each of the first and second elongate pieces is movable along the length of the head band assembly and comprising a first length portion and a second length portion having a larger bending strength than the first length portion.

3. The adjustable headphone of claim 2, wherein the first elongate piece and the second elongate piece are movable between a first position and a second position, wherein in the first position, a majority of the first length portion of each of the first and second elongate pieces overlaps the second length portion of the other of the first and second elongate pieces, and in the second position, the first length portion of each of the first and second elongate pieces does not overlap the second length portion of the other of the first and second elongate pieces.

4. The adjustable headphone of claim 3, wherein in the second position, only a portion of the first length portion of each of the first and second elongate pieces overlaps each other.

5. The adjustable headphone of claim 2, wherein the first length portion of each of the first and second elongate pieces extends from its corresponding second length portion and toward the second length portion of the other elongate piece.

6. The adjustable headphone of claim 5, wherein the first length portion of each of the first and second elongate pieces extends from its corresponding second length portion and toward the second length portion of the other elongate piece, and wherein the second length portions of the first and second elongate pieces are closer to each other in a first position than in a second position.

7. The adjustable headphone of claim 3, wherein the head band assembly has a largest bending strength in a first position and a smallest bending strength in the second position.

8. The adjustable headphone of claim 1, wherein the first length portion has a smaller width than the second length portion.

9. The adjustable headphone of claim 1, wherein the first length portion has a smaller thickness than the second length portion.

10. The adjustable headphone of claim 1, wherein the first length portion is formed of a material having a smaller bending modulus than the second length portion.

11. The adjustable headphone of claim 1, wherein the head band assembly further comprises an actuator to move the first and second elongate pieces.

12. The adjustable headphone of claim 11, wherein the actuator rotates to cause the first and second elongate pieces to move in opposite directions along the length of the head band assembly.

13. The adjustable headphone of claim 11, wherein the actuator comprises a gear and each of the first length portions of the first and second elongate pieces comprises a gear rack meshed with the gear of the actuator, and the actuator rotates to move the first and second elongate pieces in opposite directions along the length of the head band assembly.

14. The adjustable headphone of claim 11, wherein the actuator comprises a ratchet wheel and each of the first length portions of the first and second elongate pieces comprises a ratchet portion engaged with the ratchet wheel of the actuator, and the actuator rotates to move the first and second elongate pieces in opposite directions along the length of the head band assembly.

15. The adjustable headphone of claim 11, wherein the actuator is in a friction engagement with each of the first length portions of the first and second elongate pieces, and the actuator rotates to move the first and second elongate pieces in opposite directions along the length of the head band assembly.

16. The adjustable headphone of claim 1, wherein at least some of the sidewall portions are formed with an inwardly extending ledge, and the lower surface of the base portion, the sidewall portions and the ledge define a channel for receiving the first and second elongate pieces and cooperate to facilitate the movement of the first and second elongate pieces.

17. The adjustable headphone of claim 16, wherein at least some of the sidewall portion pairs are formed with a hole in each of the opposing sidewall portions, and the holes in the opposing sidewall portions is configured to receive a roller, the rollers cooperates with the lower surface of the base portion, the sidewall portions and the ledges for facilitating the movement of the first and second elongate pieces.

18. The adjustable headphone of claim 16, wherein the lower surface of the base portion is formed with a plurality of ribs for facilitating the movement of the first and second elongate pieces.

19. The adjustable headphone of claim 12, wherein the actuator further comprises an actuator body connected to a gear and a folded ring pivotably connected to the actuator body for facilitating the rotation of the actuator.

* * * * *